(12) United States Patent
Bennett et al.

(10) Patent No.: US 10,904,917 B2
(45) Date of Patent: Jan. 26, 2021

(54) SYSTEM AND METHOD FOR DYNAMICALLY SCHEDULING WIRELESS TRANSMISSIONS WITHOUT COLLISION

(71) Applicant: IsoLynx, LLC, Haverhill, MA (US)

(72) Inventors: Justin Emrys Bennett, Newburgh, IN (US); Mike Etienne Ciholas, Evansville, IN (US); Herbert Alan Hollinger, Mt. Vernon, IN (US); Jeremy Wayne Aldridge, Evansville, IN (US); Mason Thomas Blankenship, Evansville, IN (US); Daniel Lawrence Morris, Elyria, OH (US)

(73) Assignee: ISOLYNX, LLC, Haverhill, MA (US)

( * ) Notice: Subject to any disclaimer, the term of this patent is extended or adjusted under 35 U.S.C. 154(b) by 117 days.

(21) Appl. No.: 16/048,857

(22) Filed: Jul. 30, 2018

(65) Prior Publication Data

US 2018/0338323 A1 Nov. 22, 2018

Related U.S. Application Data

(63) Continuation of application No. 15/208,782, filed on Jul. 13, 2016, now Pat. No. 10,039,128.
(Continued)

(51) Int. Cl.
*H04W 74/04* (2009.01)
*H04W 84/20* (2009.01)
*H04W 72/04* (2009.01)

(52) U.S. Cl.
CPC ....... *H04W 74/04* (2013.01); *H04W 72/0446* (2013.01); *H04W 84/20* (2013.01)

(58) Field of Classification Search
CPC .. H04W 74/04; H04W 72/0446; H04W 84/20
See application file for complete search history.

(56) References Cited

U.S. PATENT DOCUMENTS 4,987,571 A 1/1991 Haymond et al.
6,661,342 B2 12/2003 Hall et al.
(Continued)

FOREIGN PATENT DOCUMENTS

WO WO 2001/008417 2/2001
WO WO 2010/018523 2/2010
(Continued)

OTHER PUBLICATIONS

Fraunhofer IIS 2010 Annual Report at 83 (available at http://www.eas.iis.fraunhofer.de/content/dam/eas/de/docume nts/jahresbericht/JB10_engl_low_res_tcm182-91049.pdf.
(Continued)

*Primary Examiner* — Jenee Holland
(74) *Attorney, Agent, or Firm* — Lathrop GPM LLP (57) ABSTRACT

A system and method dynamically schedule wireless transmissions without collision. A master transmitter periodically transmits a time mark during a first predefined time slot of a plurality of consecutive time slots that form a transmission block. Multiple consecutive transmission blocks form a frame. An announcement transmission from a wireless transmitting device is received via at least one receiver during a second predefined time slot of the plurality of time slots. An allocator allocates, at least partly based upon the received announcement transmission, a third time slot of the plurality of time slots to the wireless transmitting device. A time slot reservation area of at least one subsequently transmitted time mark includes indication of the allocation of the third time slot to the wireless transmitting device. The wireless transmitting device receives the subsequently transmitted time mark and transmits only during the third time slot of subsequent frames.

20 Claims, 8 Drawing Sheets

Related U.S. Application Data (60) Provisional application No. 62/192,017, filed on Jul. 13, 2015.

(56) References Cited

U.S. PATENT DOCUMENTS

| | | | |
|---|---|---|---|
| 6,710,713 B1 | 3/2004 | Russo | |
| 6,931,023 B2* | 8/2005 | Lin | H04J 3/16 370/458 |
| 6,998,987 B2 | 2/2006 | Lin | |
| 7,525,989 B2* | 4/2009 | Cline | H04J 3/12 370/438 |
| 8,300,668 B2* | 10/2012 | Kim | H04J 3/0682 370/508 |
| 8,989,880 B2 | 3/2015 | Wohl et al. | |
| 9,002,485 B2 | 4/2015 | Wohl et al. | |
| 9,014,830 B2 | 4/2015 | Wohl et al. | |
| 9,180,357 B2 | 11/2015 | Richley | |
| 9,517,417 B2 | 12/2016 | Austerlade et al. | |
| 9,531,415 B2 | 12/2016 | Stelfox et al. | |
| 9,571,143 B2 | 2/2017 | Richley | |
| 9,602,152 B2 | 3/2017 | Wohl et al. | |
| 9,642,133 B2 | 5/2017 | Shibuta et al. | |
| 9,667,287 B2 | 5/2017 | Richley | |
| 9,698,841 B2 | 7/2017 | Alonso et al. | |
| 9,699,278 B2 | 7/2017 | Richley et al. | |
| 9,715,005 B2 | 7/2017 | Hughes et al. | |
| 9,742,450 B2 | 8/2017 | O'Hagan et al. | |
| 2002/0063622 A1* | 5/2002 | Armstrong | G06K 7/0008 340/10.31 |
| 2002/0067709 A1* | 6/2002 | Yamada | H04B 7/2643 370/337 |
| 2002/0105918 A1* | 8/2002 | Yamada | H04B 7/2643 370/294 |
| 2002/0116147 A1 | 8/2002 | Vock et al. | |
| 2003/0001009 A1* | 1/2003 | Collins | G06K 7/0008 235/385 |
| 2003/0163287 A1 | 8/2003 | Vock et al. | |
| 2003/0179756 A1* | 9/2003 | Cain | H04W 72/085 370/395.42 |
| 2003/0193908 A1* | 10/2003 | Cain | H04B 7/2643 370/330 |
| 2003/0193918 A1* | 10/2003 | Cain | H04W 72/085 370/337 |
| 2003/0193919 A1* | 10/2003 | Cain | H04W 72/046 370/337 |
| 2004/0006424 A1 | 1/2004 | Joyce et al. | |
| 2004/0046642 A1* | 3/2004 | Becker | G01V 15/00 340/10.32 |
| 2004/0178955 A1 | 9/2004 | Menache et al. | |
| 2004/0198222 A1* | 10/2004 | Ertin | G06K 7/0008 455/41.1 |
| 2005/0025093 A1* | 2/2005 | Yun | H04W 76/10 370/328 |
| 2006/0022823 A1* | 2/2006 | Ryal | G08B 13/1418 340/572.1 |
| 2006/0087427 A1* | 4/2006 | Le | A63H 18/026 340/539.13 |
| 2006/0152303 A1 | 7/2006 | Liang et al. | |
| 2006/0160488 A1 | 7/2006 | Sueoka et al. | |
| 2006/0175407 A1* | 8/2006 | Kinoshita | G06K 7/0008 235/451 |
| 2007/0085661 A1* | 4/2007 | Yamazoe | G06K 7/10297 340/10.1 |
| 2007/0126558 A1 | 6/2007 | Donato | |
| 2007/0133457 A1* | 6/2007 | Doi | H04W 74/0816 370/329 |
| 2008/0137620 A1 | 6/2008 | Wang et al. | |
| 2008/0140233 A1 | 6/2008 | Seacat | |
| 2008/0150674 A1* | 6/2008 | Park | H04W 28/06 340/3.41 |
| 2009/0040021 A1* | 2/2009 | Seo | G06K 7/10049 340/10.1 |
| 2009/0048039 A1 | 2/2009 | Holthouse et al. | |
| 2009/0111502 A1* | 4/2009 | Choi | G06K 7/0008 455/522 |
| 2009/0231198 A1 | 9/2009 | Walsh et al. | |
| 2009/0303016 A1 | 12/2009 | Deuber et al. | |
| 2009/0315670 A1* | 12/2009 | Naressi | G06F 21/10 340/5.8 |
| 2010/0039237 A1 | 2/2010 | Radhakrishnan et al. | |
| 2010/0176926 A1* | 7/2010 | Jo | H04W 72/082 340/10.2 |
| 2010/0184563 A1 | 7/2010 | Molyneus et al. | |
| 2010/0207737 A1* | 8/2010 | Park | G06K 7/0008 340/10.2 |
| 2010/0246428 A1* | 9/2010 | Chang | G06F 1/3228 370/252 |
| 2010/0283630 A1 | 11/2010 | Alonso | |
| 2011/0013580 A1* | 1/2011 | Nakasato | H04W 72/04 370/329 |
| 2011/0040803 A1* | 2/2011 | Pasquero | G06Q 10/109 707/803 |
| 2011/0041068 A1* | 2/2011 | Pasquero | G06Q 10/06311 715/738 |
| 2011/0063085 A1* | 3/2011 | Jang | H04W 28/06 340/10.2 |
| 2011/0205022 A1 | 8/2011 | Cavallaro et al. | |
| 2012/0033620 A1* | 2/2012 | Thoen | H04J 3/0697 370/329 |
| 2012/0044827 A1* | 2/2012 | In | H04W 56/0075 370/252 |
| 2014/0111313 A1* | 4/2014 | Wild | G06K 7/10059 340/10.42 |
| 2014/0361875 A1 | 12/2014 | O'Hagan et al. | |
| 2014/0361890 A1 | 12/2014 | O'Hagan et al. | |
| 2014/0361906 A1 | 12/2014 | Hughes et al. | |
| 2014/0362120 A1 | 12/2014 | Wohl et al. | |
| 2014/0364973 A1 | 12/2014 | O'Hagan et al. | |
| 2014/0364977 A1 | 12/2014 | Wohl et al. | |
| 2014/0365194 A1 | 12/2014 | O'Hagan et al. | |
| 2014/0365415 A1 | 12/2014 | Stelfox et al. | |
| 2014/0365639 A1 | 12/2014 | Wohl et al. | |
| 2014/0365640 A1 | 12/2014 | Wohl et al. | |
| 2015/0149250 A1 | 5/2015 | Fein et al. | |
| 2015/0149837 A1 | 5/2015 | Alonso et al. | |
| 2015/0178817 A1 | 6/2015 | Fein et al. | |
| 2015/0221004 A1* | 8/2015 | Pavlo | G06Q 50/188 705/80 |
| 2015/0335952 A1 | 11/2015 | Wohl et al. | |
| 2015/0335953 A1 | 11/2015 | Wohl et al. | |
| 2015/0335954 A1 | 11/2015 | Wohl et al. | |
| 2015/0378002 A1 | 12/2015 | Hughes et al. | |
| 2015/0379459 A1* | 12/2015 | Russell | G06Q 10/087 235/380 |
| 2016/0113027 A1* | 4/2016 | Zhao | H04W 72/12 370/337 |
| 2016/0361595 A1 | 12/2016 | O'Hagan et al. | |
| 2017/0019897 A1 | 1/2017 | Bennett et al. | |
| 2017/0043260 A1 | 2/2017 | Austerlade et al. | |
| 2017/0056721 A1 | 3/2017 | Stelfox et al. | |
| 2017/0173387 A1 | 6/2017 | Wohl et al. | |
| 2017/0257127 A1 | 9/2017 | Alonso et al. | |
| 2017/0272556 A1 | 9/2017 | Richley et al. | |
| 2017/0317702 A1 | 11/2017 | O'Hagan et al. | |

FOREIGN PATENT DOCUMENTS

| | | |
|---|---|---|
| WO | WO 2010/073158 | 7/2010 |
| WO | WO 2014/197575 | 12/2014 |
| WO | WO 2014/197600 | 12/2014 |
| WO | WO 2014/197618 | 12/2014 |
| WO | WO 2014/197623 | 12/2014 |
| WO | WO 2014/197679 | 12/2014 |
| WO | WO 2016/196863 | 12/2016 |

OTHER PUBLICATIONS

InMotio—Tactical, Training and Performance Management video (available at https://www.youtube.com/watch?v=dq1n7IYePJI).

(56) References Cited

OTHER PUBLICATIONS

International Search Report with Written Opinion corresponding to International Patent Application No. PCT/US2016/041980, dated Sep. 28, 2016.
IsoLynx Real-Time Player Tracking & Game Analysis Technology (2010), available at http://web.archive.org/web/20100604012151/http://www.finishlynx.com/isolynx/.
*Lynx System Developers, Inc. et al* v. *Zebra Enterprise Solutions Corporation et al.*; case No. 1:2015cv12297; United States District Court District of Massachusetts [case citation for consideration by Examiner; no NPL document provided].
Zebra Intros Next-Gen RTLS Leveraging Ultra-Wideband Technology, RFID Journal available at http://www.rfidjournal.com/articles/view?7889.
Australian Patent Application No. 2016291761, Examination Report dated Mar. 19, 2019, 6 pages.

\* cited by examiner

DATA FIELD OF MASTER TIME MARK

| TIME SLOT COUNTER 502 | TIME SLOT RESERVATIONS AREA 504 | AUXILIARY COMMAND AREA 506 |
|---|---|---|

| | NODE ID | TIME SLOT VALUE | INTERVAL VALUE | PHASE VALUE | TIME MARK PHASE |
|---|---|---|---|---|---|
| 601(1) → | 602(1) | 604(1) | 606(1) | 608(1) | 610(1) |
| 601(2) → | 602(2) | 604(2) | 606(2) | 608(2) | 610(2) |
| 601(3) → | 602(3) | 604(3) | 606(3) | 608(3) | 610(3) |
| 601(4) → | 602(4) | 604(4) | 606(4) | 608(4) | 610(4) |

SYSTEM AND METHOD FOR DYNAMICALLY SCHEDULING WIRELESS TRANSMISSIONS WITHOUT COLLISION

RELATED APPLICATIONS

This application is a continuation of U.S. patent application Ser. No. 15/208,782, filed Jul. 13, 2016, which claims the benefit of priority to U.S. Patent Application Ser. No. 62/192,017, titled "System And Method For Dynamically Scheduling Wireless Transmissions Without Collisions", filed Jul. 13, 2015. The above applications are incorporated herein by reference in their entireties.

BACKGROUND

Radio-frequency (RF) tracking is used in many different types of sporting events and for a variety of purposes. In ballgames, RF tags may be attached to players and balls to track their respective movements. In this case, each RF tag is in RF communication with multiple receivers at different respective locations to determine the position of each RF tag. It is also commonplace to equip runners in a race with RF tags for finish line timing, and in some cases for tracking the progress of the runners during the race. RF tracking is also utilized to transmit biometric data of an athlete, such as an athlete's heart rate, by coupling an RF tag with a biometric measurement device carried by the athlete.

In RF tracking, the RF tag attached to the object to be tracked (e.g., athlete, ball, car, etc.) emits a radio signal that is detected by one or more receivers. Based upon the expected speed of movement of the tracked objects, the ping rate (i.e., periodicity, frequency or rate of transmission) from each tag may require between ten and one hundred locates per second. Where many objects are tracked concurrently within the same field of operation, many tags may be configured to transmit frequently, typically resulting in overlap of transmission. This is particularly challenging in events like football where a large number of fast moving objects are tracked to continuously provide position information for each athlete and the ball. In many cases, the quality of location determination is compromised by transmission overlap, often resulting in failure to locate one or more objects. Thus, RF communication limitations impose limits on (a) the number of objects that can be simultaneously tracked and/or (b) the accuracy with which the objects can be tracked.

SUMMARY

In one embodiment, a system dynamically schedules wireless transmissions without collision within a repeating frame. Each frame is divided into a plurality of consecutive blocks and each block is divided into a plurality of consecutive time slots. A first predefined time slot in each block is used for announcement transmissions. The system includes a master transmitter capable of transmitting a master time mark during a second predefined time slot in each block. The master time mark includes a time slot reservation area for indicating dynamic allocation of time slots. The system also includes a processor communicatively coupled with the master transmitter, a non-transitory memory communicatively coupled with the processor, a time slot reservation table stored within the memory for tracking the predefined time slots and dynamic allocation of the time slots within each block, and an allocator, implemented as machine readable instructions stored in the memory and executed by the processor, capable of: allocating, based upon the time slot reservation table, at least one unallocated time slot in at least one of the plurality of blocks for use by a transmitting device in response to an announcement message received from the transmitting device during the first predefined time slot; and updating the time slot reservation area and the time slot reservation table to indicate the allocation of the at least one time slot to the transmitting device. The transmitting device receives a subsequent master time mark and transmits only during the indicated at least one time slot of a subsequent frame.

In another embodiment, a method dynamically schedules wireless transmissions without collision. A master transmitter periodically transmits a time mark during a first predefined time slot of a plurality of consecutive time slots that form a transmission block. Multiple consecutive transmission blocks form a frame. An announcement transmission from a wireless transmitting device is received via at least one receiver during a second predefined time slot of the plurality of time slots. An allocator allocates, at least partly based upon the received announcement transmission, a third time slot of the plurality of time slots to the wireless transmitting device. A time slot reservation area of at least one subsequently transmitted time mark includes indication of the allocation of the third time slot to the wireless transmitting device. The wireless transmitting device receives the subsequently transmitted time mark and transmits only during the third time slot of subsequent frames.

DETAILED DESCRIPTION

This document describes example systems and methods for dynamically scheduling transmissions from a plurality of wireless tags. In the examples shown, the wireless tag transmissions are used to track objects within an operational area using ranging techniques. However, the disclosed dynamic scheduling systems and methods may be used for other purposes, such as data transfer, without departing from the scope hereof. The primary characteristics of the disclosed systems and methods are a global clocking scheme that creates defined time slots that are used for slotted transmissions that favor high and adjustable transmission rates, with dynamic and automatic registration and configuration of the wireless tags. The advantages of the disclosed systems and methods are that transmission collisions are avoided by dynamically assigning one or more of the time slots for use by each transmitting device such that only one device is transmitting at any one time.

Figure 1:
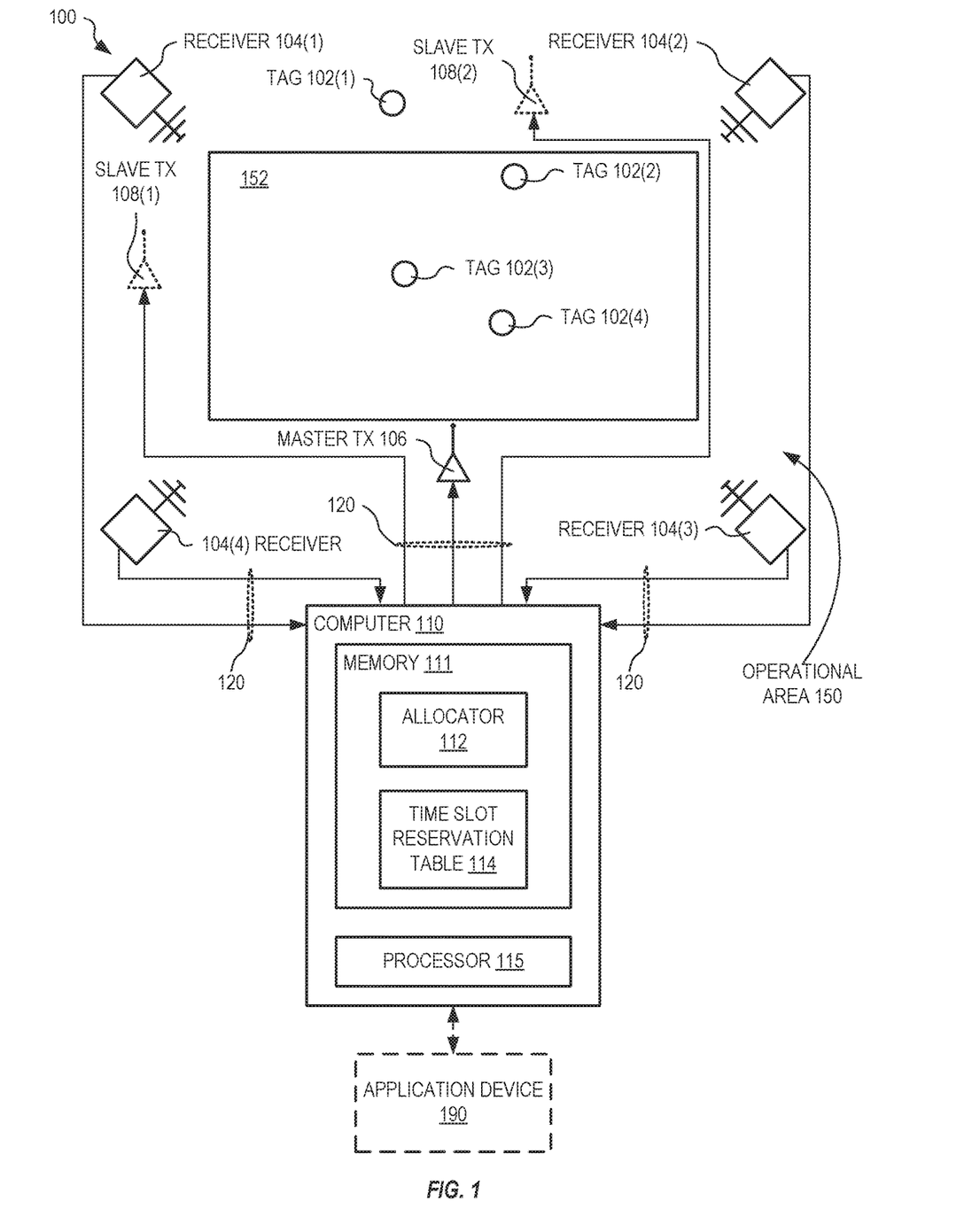
FIG. 1 shows one example system for dynamically scheduling wireless transmissions without collision, in an embodiment.

FIG. 1 shows one example system 100 for dynamically scheduling wireless transmissions. System 100 operates to track objects (participants, officials, balls, equipment, etc.) at a sporting event, for example. System 100 includes a plurality of wireless tags 102 located within an operational area 150 (e.g., each tag 102 may be attached to an object to be tracked), at least one receiver 104 (also known as sensors and anchors), a master transmitter 106, optionally one or two slave transmitters 108, and a computer 110. System 100 may use more or fewer tags 102 and/or receivers 104 without departing from the scope hereof. System 100 receives transmissions from tags 102 when tags 102 are within an operational area 150. The operational area 150 may include a performance area 152, such as an American football field, a race track, or similar sporting arenas.

In the example of FIG. 1, system 100 is shown with four receivers 104(1)-(4) positioned around operational area 150 and communicatively coupled, via a network 120, with computer 110. Network 120 is for example based upon one or more of Ethernet, Wi-Fi, UWB, cellular and USB. Transmissions from wireless tags 102 are received by one or more of receivers 104 and information and data of those received transmissions are sent to computer 110 via a network 120. Computer 110 includes one or more processors 115, memory 111, and an allocator 112. The allocator 112 may be implemented as software having machine readable instructions stored within memory 111 and executed by processor 115 to configure tags 102, receivers 104, and transmitters 106, 108 of system 100 for operation, as described in detail below.

In one embodiment, wireless tags 102, receivers 104, and transmitters 106, 108 operate within the ultra-wide-band (UWB) frequency range using conventional UWB protocols, where each tag 102, receiver 104, and transmitters 106, 108 is configured with, for example, at least one DW1000 chip from DecaWave Ltd. The DW1000 is a fully integrated single chip UWB low-power low-cost transceiver IC compliant to IEEE802.15.4-2011. However, wireless tags 102, receivers 104, and transmitters 106, 108 may operate at other frequencies, use other protocols, and use other chips without departing from the scope hereof.

Timing:

In the following description, timing is based upon the duration of each transmission from wireless tags 102.

Figure 2:
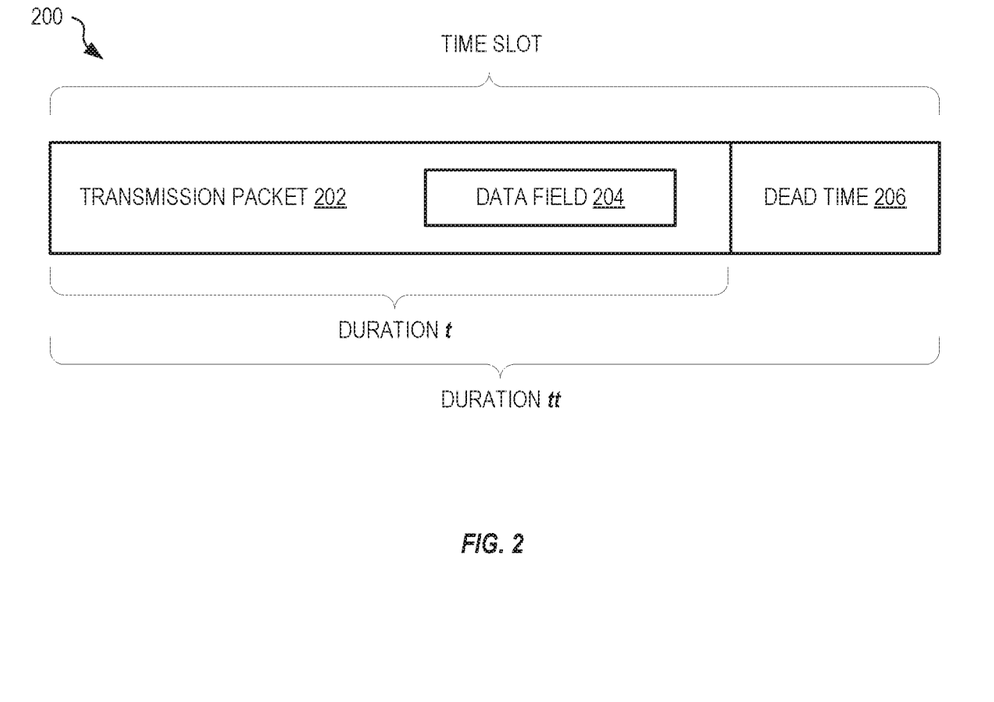
FIG. 2 shows one example time slot that is defined as the smallest period able to contain a transmission packet, in an embodiment.

FIG. 2 shows one example time slot 200 that has a duration tt that is longer than the duration t of a transmission packet 202. That is, the duration of time slot 200 is long enough to include transmission packet 202 and a dead time 206, which is a period where no transmission is desired and is included to prevent transmission collision that might occur if a local clock of a wireless tag 102 transmitting in a first time slot drifts relative to a local clock of another wireless tag 102 transmitting in an adjacent time slot 200. In one example, time slot 200 has a period of 132 µs, giving a total of about 7,600 time slots per second. In this example, transmission packet 202 includes a data field 204, however, transmission packet 202 may have other formats without departing from the scope hereof. In one example, shortest duration t of transmission packet 202 is 120 µs.

System 100, and in particular allocator 112, dynamically controls transmission time (also known as air time) of transmitting devices (e.g., wireless tags 102, transmitter 106, 108) according to time slots 200. The number of consecutive time slots 200 allocated for any particular transmission defines a maximum packet size that may be transmitted. That is, allocator 112 may allocate multiple time slots 200 to any transmitting device to allow for transmissions requiring a duration greater than a single time slot 200.

Figure 3:
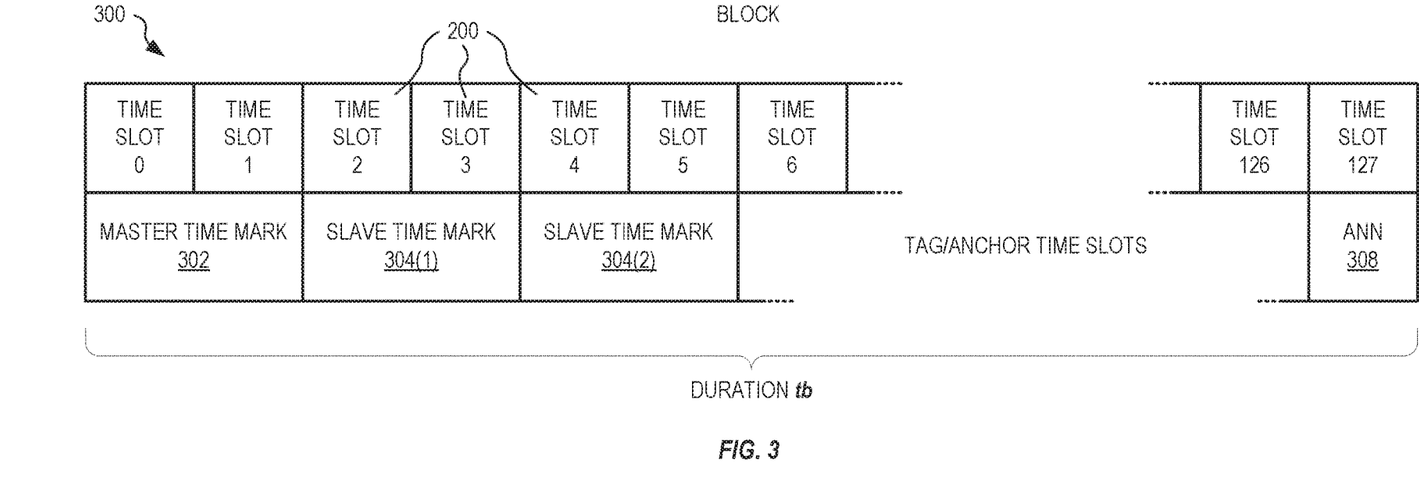
FIG. 3 shows one example transmission block formed of one-hundred and twenty-eight slots of FIG. 2, in an embodiment.

FIG. 3 shows one example transmission block 300 that has a duration tb that includes one-hundred and twenty-eight consecutive time slots 200, consecutively numbered 0 through 127. In this example, duration tb is about 16.9 ms, and consecutive transmission blocks 300 therefore repeat at a frequency of about 59 Hz. However, other block durations, and thus the number of time slots 200 contained therein, may be used without departing from the scope hereof.

The start of each transmission block 300 is signaled by a master time mark 302 that is transmitted by master transmitter 106, and optionally followed by one or both of a slave time mark 304(1), transmitted by slave transmitter 108(1), and a slave time mark 304(2), transmitted by slave transmitter 108(2). In one embodiment, each time mark 302, 304, is allocated two time slots 200; specifically, time slots 0 and 1 are dedicated for use by master time mark 302, time slots 2 and 3 are dedicated for use by slave time mark 304(1), and time slots 4 and 5 are dedicated for use by slave time mark 304(2). The number of time slots allocated for use by time marks 302, 304 is based upon the amount of data to be included within each time mark. Time slot 127 is dedicated for announcement 308 transmission by tags 102, where any tag 102 that is not yet configured may transmit an announcement 308 within time slot 127 to announce its presence to system 100.

Allocator 112 dynamically allocates time slots 6 through 126 for use by tags 102 and optionally by receivers 104. Allocator 112 maintains a time slot reservation table 114 within memory of computer 110 that defines which time slots 200 of each transmission block 300 are allocated for use by each transmitting device (e.g., tags 102 and optionally receivers 104, and transmitters 106, 108).

Figure 4:
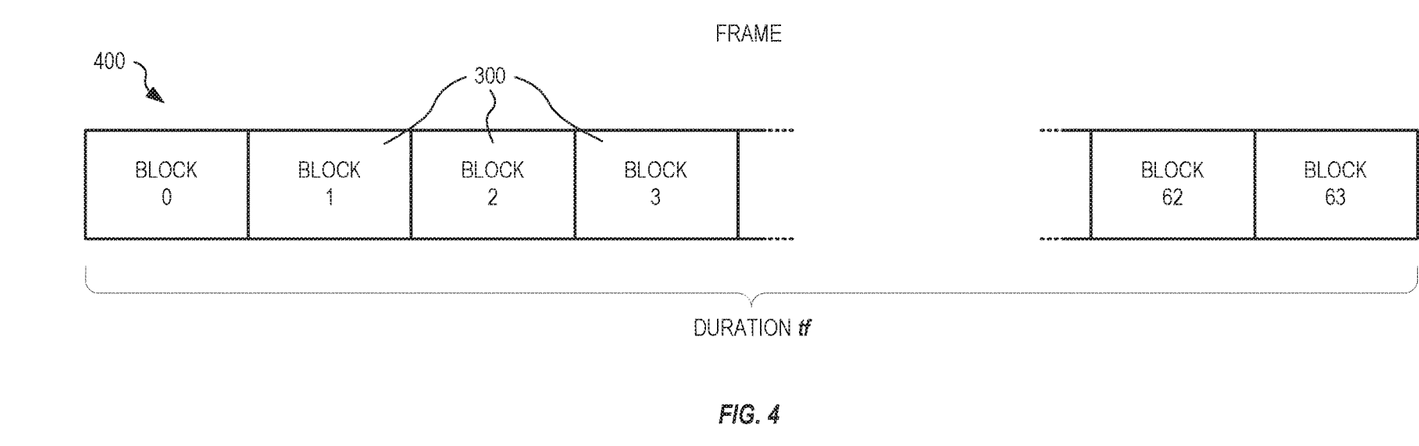
FIG. 4 shows one example frame having sixty-four blocks of FIG. 3, in an embodiment.

FIG. 4 shows one example transmission frame 400 with a duration tf that includes sixty-four consecutive transmission blocks 300. Continuing with the above example, duration tf of each transmission frame 400 is just over one second.

Packet Format:

Within system 100, transmissions use the format defined in transmission packet 202 of FIG. 2, where data field 204 includes at least the following data items:

| Data Item Name | Description |
|---|---|
| packet type | defines the kind of packet being sent. |
| sender node ID | gives the sender's node ID or 0x00 if unassigned. |

Additional data may follow these two data items as needed. In one embodiment, sender node ID is one byte, and thus operation of system 100 may include up to 255 different transmitting devices (e.g., tags 102, receivers 104, and transmitters 106, 108).

Operation:

The operation of system 100 is described from the point of view of the participating devices. At first, operation is assumed to be with a separate backhaul network (i.e., using network 120) for transferring data from receivers 104 to computer 110. Later, using the UWB as backhaul will be discussed, wherein data sent from receivers 104 to computer 110 are transmitted wirelessly and share the bandwidth provided by allocation of time slots 200.

Master Transmitter

Master transmitter 106 contains a very stable clock and transmits master time mark 302 at the start of each transmission block 300 to provide global timing to system 100. Only one master transmitter 106 is used within system 100 and is positioned to maximize the number of other devices 102, 104, 108 that receive its transmission (i.e., master time mark 302). Master transmitter 106 is assumed to have adequate amounts of power to receive and transmit as needed.

Figure 5:
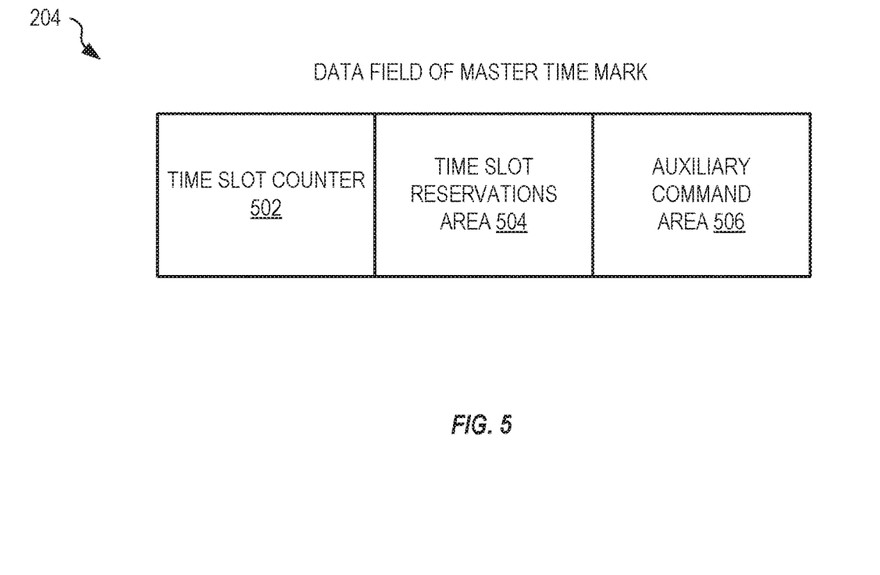
FIG. 5 shows one example data field of the master time mark of FIG. 4, in an embodiment.

FIG. 5 shows one example data field 204 of master time mark 302. Within data field 204, master time mark 302 includes a time slot counter 502, a time slot reservations area 504, and an auxiliary command area 506. Time slot counter 502 is an integer value that is initialized to zero and incremented by the number of time slots 200 within each transmission block 300 (e.g., 128) for each new transmission of master time mark 302. Within master time mark 302, time slot counter 502 thereby identifies the time slot 200 of the current transmission. In one example, slot counter 502 is implemented as a 32 bit number, and therefore does not wrap around for 156 hours (6.5 days) of continuous operation. Auxiliary command area 506 is an optional command and argument area that allows control commands and data to be included within master time mark 302 and thus receives by any receiving device (e.g., tags 102, receivers 104, and slave transmitters 108).

Figure 6:
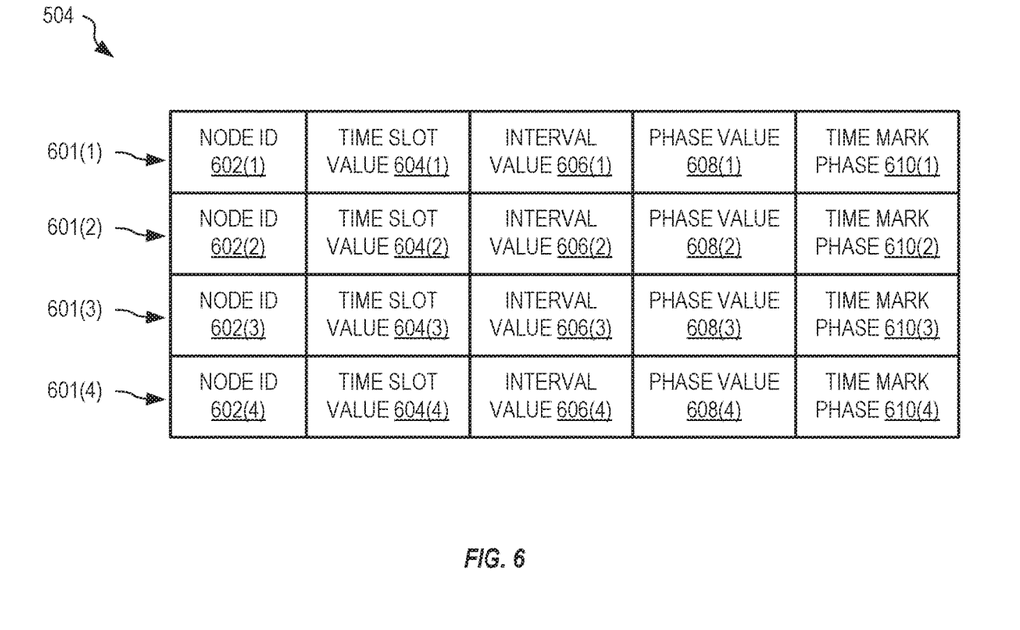
FIG. 6 shows the time slot reservation area of FIG. 5 in further example detail, in an embodiment.

FIG. 6 shows time slot reservations area 504 of FIG. 5 in further example detail. Time slot reservations area 504 contains an array of time slot allocations 601, where each time slot allocation 601 includes a node ID 602, a time slot value 604, an interval value 606, a phase value 608, and a time mark phase value 610. Node ID 602 identifies the transmitter (e.g., a tag 102) to which the reservation applies, and time slot value 604 identifies one time slot 200 within transmission block 300 (e.g., a value from 6 to 126). In one embodiment, time slot reservations area 504 includes four time slot allocations 601, where a first master time mark 302 includes time slot allocations 601 for a first four different wireless tags 102, a subsequent master time mark 302 includes time slot allocations 601 for a next different set of four wireless tags, and so on, repeating in a cyclic manner. Use of interval value 606, phase value 608, and time mark phase value 610 is described in detail below.

Figure 10:
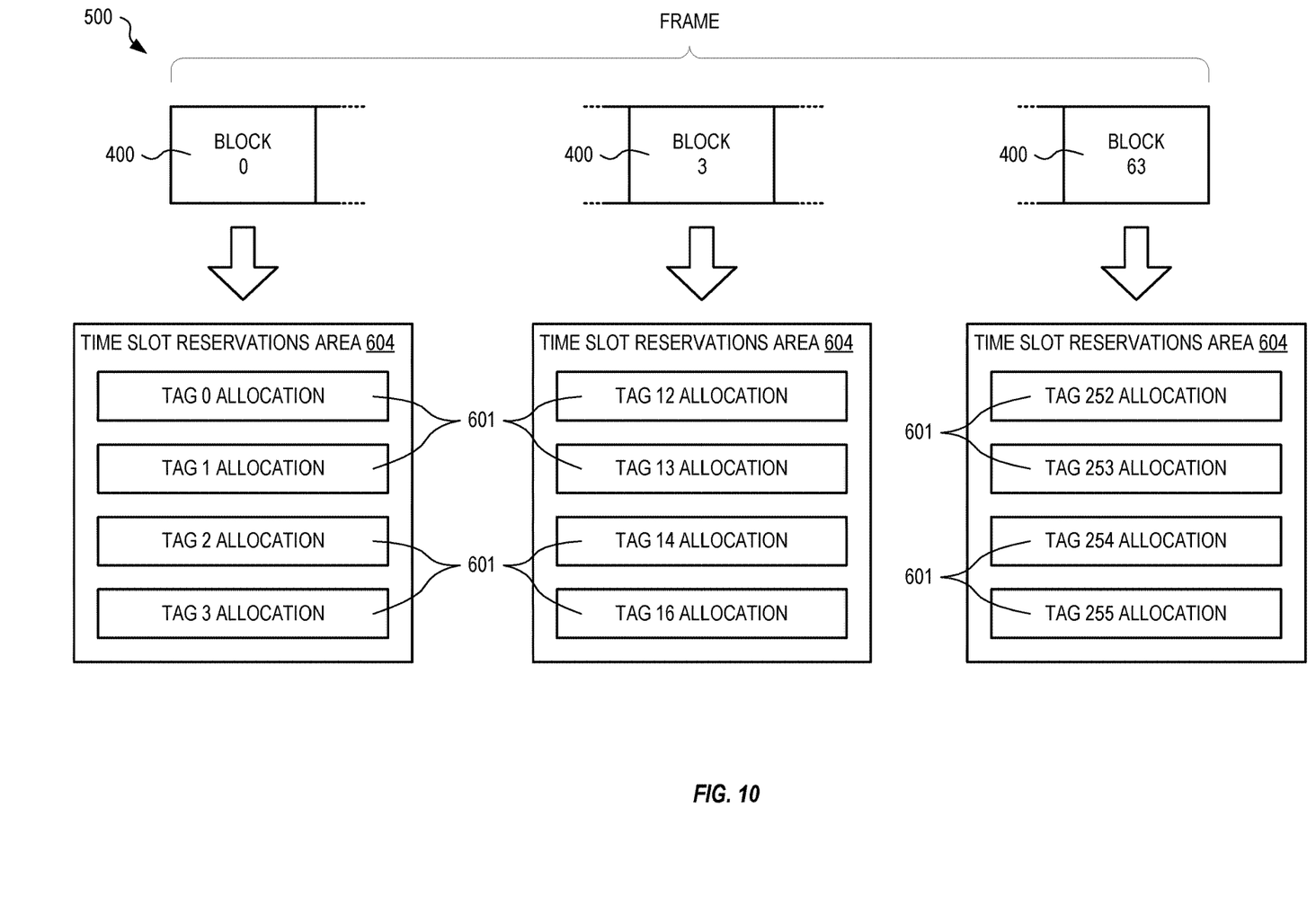
FIG. 10 is a schematic illustrating example distribution of the time slot allocations of FIG. 6 within the transmission frame of FIG. 4, in an embodiment.

FIG. 10 is a schematic illustrating example distribution of time slot allocations 601 within transmission frame 400, where each block may include time slot allocations 601 for four different wireless tags 102. In the example of FIG. 3, up to two-hundred and fifty-six time slot allocations 601 may be included for different transmitting nodes (e.g., tags 102 and receivers 104). Although shown to be allocated sequentially within transmission frame 400, time slot allocations 601 may be allocated dynamically as tags 102 announce themselves to system 100, and may therefore not be in sequence.

Once configured, master transmitter 106 emits master time mark 302 precisely at a period of transmission block 300 until system 100 is shut down.

Slave Transmitter(s)

Optionally, one or both of slave transmitters 108(1) and 108(2) may be included to extend operation of system 100 beyond the transmission range of master transmitter 106. Slave transmitters 108(1) and 108(2) transmit slave time mark 304(1) and 304(2), respectively, and may be positioned such that all devices (e.g., tags 102 and receivers 104) of system 100 within operational area 150 are able to receive at least one of master time mark 302 and slave time marks 304(1) and 104(2). In electrical design, each slave transmitter 108 is substantially identical to master transmitter 106, and is positioned such that (a) it is in range to receive master time mark 302, and (b) a sufficient number of receivers 104 are able to receive both slave time mark 304 and master time mark 302.

Each included slave transmitter 108 is configured via network 120 and receives its unique node ID, which defines which time slots 200 it transmits within, in each transmission block 300, as shown in FIG. 3 (i.e., if assigned as the first slave transmitter, it transmits within time slots 2 and 3, otherwise it transmits in time slots 4 and 5).

Once each included slave transmitter 108 is configured, it transmits slave time mark 304 containing its node ID, an adjusted slot counter (i.e., slave transmitter 108(1) sends master time mark 302 slot counter +2, and slave transmitter 108(2) sends master time mark 302 slot counter +4) and the same information as time slot reservations area 504 and auxiliary command area 506 as in master time mark 302.

If able, each slave transmitter 108 synchronizes with master transmitter 106 by receiving master time mark 302 to determine parameters for converting global time to their local clock and thereby align itself with its allocated time slot. If slave transmitter 108 does not receive master time mark 302, it may receive transmissions from one or more other nodes (e.g., tags 102 and other transmitter 108) and align itself with its allocated time slot 200 based upon information of time slot reservation table 114. Via network 120, slave transmitter 108 may receive information as to how to adjust its local clock to be more aligned with master transmitter 106. For example, if at least one receiver 104 receives both master time mark 302 and slave time mark 304, then, based upon received data for each of these received time marks 302, 304, computer 110 may determine an alignment error between slave time mark 304 and master time mark 302 and provide an adjustment to slave transmitter 108 via network 120.

Receivers:

Each receiver 104 is positioned such that transmissions from tags 102 within operational area 150 are received. Each receiver 104 is connected to computer 110 via network 120 and has a stable clock. Each receiver 104 is able to receive at least one of master time mark 302 and slave time mark 304, and thereby synchronizes itself for operation within system 100. Operation of receiver 104 assumes adequate amounts of power to receive and transmit as needed.

In an example mode of operation, receiver 104 receives all transmissions, records data received within transmission and at least a timestamp indicative of the time the transmission was received, and optionally one or more of signal strength, signal quality, and so on. Receiver 104 then sends this information via network 120 to computer 110.

Tags:

Tags 102 are attached to objects, such as people, athletes, balls, and so on, that are to be tracked within operational area 150. Tags 102 utilize power from at least one battery and therefore system 100 operates to configure each tag 102 with a desired ping rate such that each tag 102 transmits only as often as necessary, thereby reducing power consumption and the size of the battery needed to power the tag 102.

To conserve battery power, tag 102 configures itself in a low-power mode (also known as sleep mode) when not required to transmit, receive, or perform other operations. When initially powered on, tag 102 configures itself to periodically wake, at a low duty cycle, to receive master time mark 302 or slave time mark 304. In one embodiment, tag 102 awakens and activates its receiver to "listen" for a period greater than duration tb of one transmission block 300 once every minute, and thereby has a very low duty cycle (e.g., about 0.03%). The sleep interval between listening periods may be varied to aid in randomizing tag wake up times, thereby reducing likelihood of repeating transmission collisions where two tags awaken at the same time to request configuration.

Since tag 102 is listening for a period greater than the duration of one transmission block 300, it is assured of receiving master time mark 302 and/or slave time mark 304 when in range of an operational system 100. When tag 102 does not receive a master time make (or slave time mark) it assumes that it is not within range of operational system 100 and returns to its low-power mode.

As shown in FIG. 3, time slot 127 of each transmission block 300 is reserved for announcements 308 from tags 102 that are not yet configured by system 100. Since there are likely to be few unconfigured tags 102 during operation of system 100, and since time slot 127 precedes time slot 0 of a subsequent transmission block 300, time slot 127 is typically transmission free prior to transmission of master time mark 302 during operation.

When unconfigured, upon receiving master time mark 302 or slave time mark 304, tag 102 determines a current slot counter of the received transmission. It may also determine whether the received transmission was from master transmitter 106 or a slave transmitter 108 using either the received node ID or the received slot counter 502.

Tag 102 then computes a start time for time slot 127 of the current transmission block 300 and transmits announcement 308 within time slot 127 to identify itself to system 100, where tag announce 308 packet contains a long serial number or MAC address that uniquely identifies tag 102. Optionally, announcement 308 also includes other parameters from tag 102 (e.g., battery level, and so on). Announcement 308 is limited in length to duration dt of a single time slot 200.

After sending announcement 308, tag 102 configures itself to awaken from a low-power mode to receive master time mark 302 in a transmission block 300 that is several (e.g., sixteen) blocks into the future, wherein allocator 112 inserts time slot reservation information within that block. This block delay (e.g., sixteen blocks) allows allocator 112 time to process the received announce 308, update time slot reservation table 114, and send the appropriate time slot reservation information to master transmitter 106 and optionally to slave transmitters 108. Upon receiving its slot reservation information, tag 102 configures itself to transmit tracking information (e.g., a locate message and/or other collected information) during the assigned time slot 200.

With some probability due to collision with another announce packet from another tag 102, announce 308 may not be received by any receiver 104. When this occurs, tag 102 does not receive any time slot reservation information in the appropriate master time mark 302 or slave time marks 304 and therefore tag 102 configures itself to sleep for a variable period of between one and five seconds and then listens for a next master time mark 302 or slave time mark 304 and tries to announce again. In this way, every tag 102 awaiting configuration by computer 110 is likely to receive time slot reservation information eventually.

Announcement 308 may be received by one or more receivers 104, and received data and other information of announcement 308 is sent to computer 110. Allocator 112, based upon a desired ping rate for tag 102 and time slot reservation table 114, determining a time slot value, an interval, and a phase value for tag 102 to allocate at least one time slot 200 for use by tag 102.

The following table shows example time slot reservations that define desired ping rates of 60 Hz, 30 Hz, and 1 Hz:

| Ping Rate | Time Slot | Interval | Phase | Description |
|---|---|---|---|---|
| 60 Hz | 23 | 1 | N/A | This tag uses slot 23 in every block. |
| 30 Hz | 25 | 2 | 0 | This tag uses slot 25 in even blocks. |
| 30 Hz | 25 | 2 | 1 | This tag uses slot 25 in odd blocks, sharing slot 25 with the above 30 Hz tag 1. |
| 1 Hz | 15 | 60 | 27 | This tag uses slot 15 when slot counter mod (128 * 60) = 27. |

The interval value is a positive integer defining a block interval period between transmissions by tag 102. In the above example, an interval value of one indicates that the tag is to transmit every transmission block 300. For example, where duration dt of transmission block 300 is about 16.9 ms, this achieves a ping rate of about 60 Hz. An interval value of two indicates that the tag is to transmit every other transmission block 300, and an interval value of sixty indicates that the tag is to transmit once every sixty transmission blocks 300. Where the interval value is greater than one, a phase value indicates within which of the interval value blocks the tag is to transmit. Each phase value has a range of zero to interval value minus one and in one embodiment, tag 102 is configured to transmit when the current time slot mod (Time Slots per Block*Interval Value) is equal to the Phase Value. Thus, the defined Interval Value determines the number of tags 102 that may share use of the identified time slot. In the 60 Hz example of the above table, sixty tags 102, each tag having a different phase value, may share use of time slot 15 without collision, each operating with a ping rate of 1 Hz.

This slot reservation methodology allows each tag 102 operating within system 100 to be configured with a desired ping rate (also referred to as transmission interval or transmission rate). For example, based upon the application supported by the wireless communication between the tags 102 and computer 110, the application may dynamically select a desired transmission rate for each wireless tag 102. Further, by assigning two time slots 200 to tag 102, each time slot positioned half a block apart (e.g., time slots 6 and 70), a desired transmission rate of 120 Hz may be achieved. Where location of tag 102 is determined from each transmission, the desired ping rate may be based upon expected movement of tag 102.

In addition to the time slot reservation, interval value and phase value, defined in the above table, each tag 102 is also assigned a time mark phase value 610 that instructs tag 102 when to listen for changes in its dynamically allocated time slot reservation. For example, using the above 1 Hz ping rate example, where tag 102 is configured with a time mark phase value 610 of three, tag 102 only receives time slot reservation information within the third master time mark 302 (or slave time mark 304) of each transmission frame 400. That is, tag 102 may determine which master time mark to listen to by evaluating 'current-time-slot mod time-slotsper-block=time-mark-phase'. If the evaluation result is true, the current master time mark 302 contains a time slot allocation 601 for the tag. Thus, tag 102 need not activate its receiver to receive time marks 302, 304 when it is not expected to transmit during that block 300 and not expecting to receive time slot reservation information. Further, using the time mark phase value 610, tag 102 may determine a future time slot number containing its time slot reservations, and thereby determine a precise time when to listen for changes to its configuration. This allows tag 102 to limit the amount of time it needs to be actively receiving time marks 302, 304, to only the times when its time slot reservation is expected or for transmission blocks 300 containing its allocated time slot 200.

During a first configuration of tag 102, master time mark 302 and slave time marks 304 may assign a node ID to the tag so that the long address, serial number, or MAC address is not needed to identify the tag in subsequent transmissions.

Once tag 102 has received its time slot reservation information, it begins transmitting transmission packets 202 at the desired transmission rate, each transmission fitting within one time slot 200. Each of these transmission packets 202 contains a packet type indicating that it is a location packet and the assigned node ID of tag 102 and optionally any additional parameters the tag wants to transfer to computer 110, up to the maximum packet size that fits within one time slot 200.

Computer 110 may confirm that tag 102 has been successfully configured when it receives, from any receiver 104, data and parameters of a received packet from the tag 102 indicating the appropriate use of the allocated time slot 200.

Preferably, tag 102 is configured to receive its time slot reservation information within a master time mark 302 of the same transmission block 300 within which it is configures to transmit. Such configuration allows tag 102 to refresh/confirm its time slot reservation information and receive timing that allows tag 102 to adjust for local clock drift and thereby retain accuracy for transmission within its allocated time slot 200. Typically, time slot reservation information updates occur at a rate of less than once per transmission frame 400 (e.g., once per sixty-four blocks), and thus each master time mark 302 (and slave time marks 304) may include time slot reservation information for up to four different tags 102, as shown in FIG. 6.

If, during operation, tag 102 is unable to receive master time mark 302, it may expand its receive period to also include slave time marks 304, if available. Then, upon receiving slave time mark 304, tag 102 may then configure itself to listen only to the strongest (master or slave) time mark 302, 304 until that is no longer received, then expand its receiving period to search again (i.e., once syncing with slave time mark 304, tag 102 may utilize only slave time mark 304 until it can no longer be received).

Tag 102 may be configured to stop sending transmission packets 202 by allocating time slot 0 to the tag, whereupon tag 102 does not transmit, but still receives master time mark 302 containing its time slot reservation information. This effectively stops tag 102 from transmitting until a new time slot 200 is assigned, but does not require tag 102 to start the annunciation process again, since tag 102 is still receiving one of time marks 302, 304 and maintaining timing accuracy thereby.

If tag 102 does not receive its time slot reservation information for sixteen cycles, it returns to the unconfigured state, listens for a time mark, and tries to reconnect to system 100 by sending announcement 308 at the appropriate time when a time mark is received. Thus, when system 100 is shutdown, master and slave transmitters 106, 108 stop transmitting time marks 302, 304, respectively, and all tags cease operation (i.e., transmission) within sixteen cycles of their respective slot reservation update period.

Once slot reservation information has been received, tag 102 knows when to transmit and which time marks 302, 304 to receive for time slot reservation information. Thus, tag 102 may configure itself in low-power mode between these periods to conserve battery power.

General Operation:

Master transmitter 106 and slave transmitters 108 transmit time marks 302, 304, that are received by receivers 104. Tags 102 transmit transmission packets 202 that may be received by receivers 104. Receivers 104 send data received, along with packet information, to computer 110.

Computer 110 receives data from receivers 104 and may then communicate this data to one or more application devices 190. For example, based upon the received data, application device 190 may compute the location of each tag 102 using time difference of arrival (TDOA) algorithms and other techniques, as known in the art. From these determined locations, application device 190 may generate position reports that are provided to yet other applications. Computer 110 may use data from receiver 104 to detect unregistered tags and possible errors in system 100. Computer 110 may also record (log) the data received from receivers 104 in a raw format, which may be useful as input for testing future algorithms or for system performance analysis.

Performance:

In the example of FIG. 3, with two slave transmitters 108, time slots 6 through 126 of each transmission block 300 are available for use by tags 102. Where transmission block 300 is fully utilized, transmissions from one-hundred and twenty one tags 102 may be received during each block. Where duration tb is 16.8 ms, this allows about 7,200 tag transmissions to be received without collision each second. The dynamic allocation of system 100 allows these transmissions to be received as 120 tags transmitting at 60 Hz, 240 tags transmitting at 30 Hz, 360 tags transmitting at 20 Hz, and any mixture of rates and quantities that do not exceed the limitations of system 100.

Processing of this volume of data from receivers 104 requires significant computational resources, and a significant load may be imparted onto computer 110 and application device 190 if connected. Computer 110 may therefore be implemented as multiple computers without departing from the scope hereof.

Auxiliary Command:

As shown in FIG. 5, time mark 302 (and time marks 304) includes auxiliary command area 506 which may include commands and parameters as needed. In one example, auxiliary command area 506 is used to initiate a two way ranging (TWR) between any two of: tags 102, receivers 104, master transmitter 106, and slave transmitter(s) 108, and parameters may identify allocated time slots 200 for that purpose. In another example, auxiliary command area 506 is used to transfer bulk data between any two of tags 102, receivers 104, master transmitter 106, and slave transmitter (s) 108. In another example, auxiliary command is used to provide over-the-air updates to firmware within any one or more of tags 102, receivers 104, master transmitter 106, and slave transmitter(s) 108.

Using a Single Radio Link for Tag Transmissions and Data Backhaul:

For development and trial deployment of system 100, and possible end use of system 100 in more limited scenarios, a single radio link may be used for both wireless communication from tags 102 to receivers 104, and for transfer of information from receivers 104 to computer 110 (data backhaul), thereby alleviating the need for network 120.

In one embodiment, when using the single radio link for both tag transmission and data backhaul, system 100 is necessarily limited by the wireless bandwidth of the single radio link. For example, the number of tags 102 and receivers 104 that may be used concurrently within system 100 is limited, as compared to the number of tags 102 and receiver 104 that may be used when network 120 is used for data backhaul. To use the shared radio link, receivers 104 are configured to transmit as well as receive, all tags 102 and receivers 104 need to be able to receive master time mark 302 from master transmitter 106, and master transmitter 106 is configured to receive data from receivers 104 and provide it to computer 110.

For reasonable performance, receivers 104 are configured to "batch up" data reports from more than one tag 102 into a single transmission to master transmitter 106 and computer 110. Assuming reception of transmission packet 202 at any one receiver 104 generates twenty bytes of data, if the receiver is allocated four time slots for a batched data report, then the batched data report may contain data for up to sixteen received transmission packets 202 from tags 102. Assuming system 100 has a maximum of twenty receivers, then an example layout of block 300 would be: master: time slots 0-1, tag1: time slot 2, tag2: time slot 3, tag3: time slot 4, . . . , tag16: time slot 17, empty: time slots 18-46, receiver1: time slots 47-50, receiver2: time slots 51-54, receiver3: time slots 55-58, . . . , receiver20: time slots 123-126, and announce: time slot 127.

Empty time slots 18-46 provide time for receivers 104 to formulate the receiver tag report (batch) and do any computations needed prior to transmission. For example, where duration tb is 16.8 ms and block 300 contains one-hundred and twenty-eight time slots 200, empty time slots 18-46 provide a period of about 3.8 ms for the receiver to prepare the batched data report for transmission.

In this example configuration, system 100 performs about 960 tag locates per second. This could be sixteen tags transmitting at 60 Hz, thirty-two tags transmitting at 30 Hz, forty-eight tags transmitting at 20 Hz, ninety-six tags transmitting at 10 Hz, or various mixtures of rates and quantity. Empty slots 18-46 may be reduced to increase tag rates if desired.

Receivers 104 may be configured with their dedicated time slots using a similar mechanism as described above for tags 102; each receiver 104 may receive a slot reservation in response to their transmission of an announcement 308 packet. Since receivers 104 are not connected to a wired network, they synchronize with master transmitter 106 using announce 308 packet.

The additional use of data backhaul does not allow for use of slave transmitters 108. Therefore, all tags 102 and receivers 104 need to receive master time mark 302 from master transmitter 106.

In another embodiment, system 100 is configured as a hybrid of the above configurations where master transmitter 106 and slave transmitters 108 are on a wired or separate network, but receivers 104 use UWB backhaul for receiver tag reports. In this embodiment, slave transmitters 108 may collect data from receivers 104 that are not received by master transmitter 106.

Figure 7:
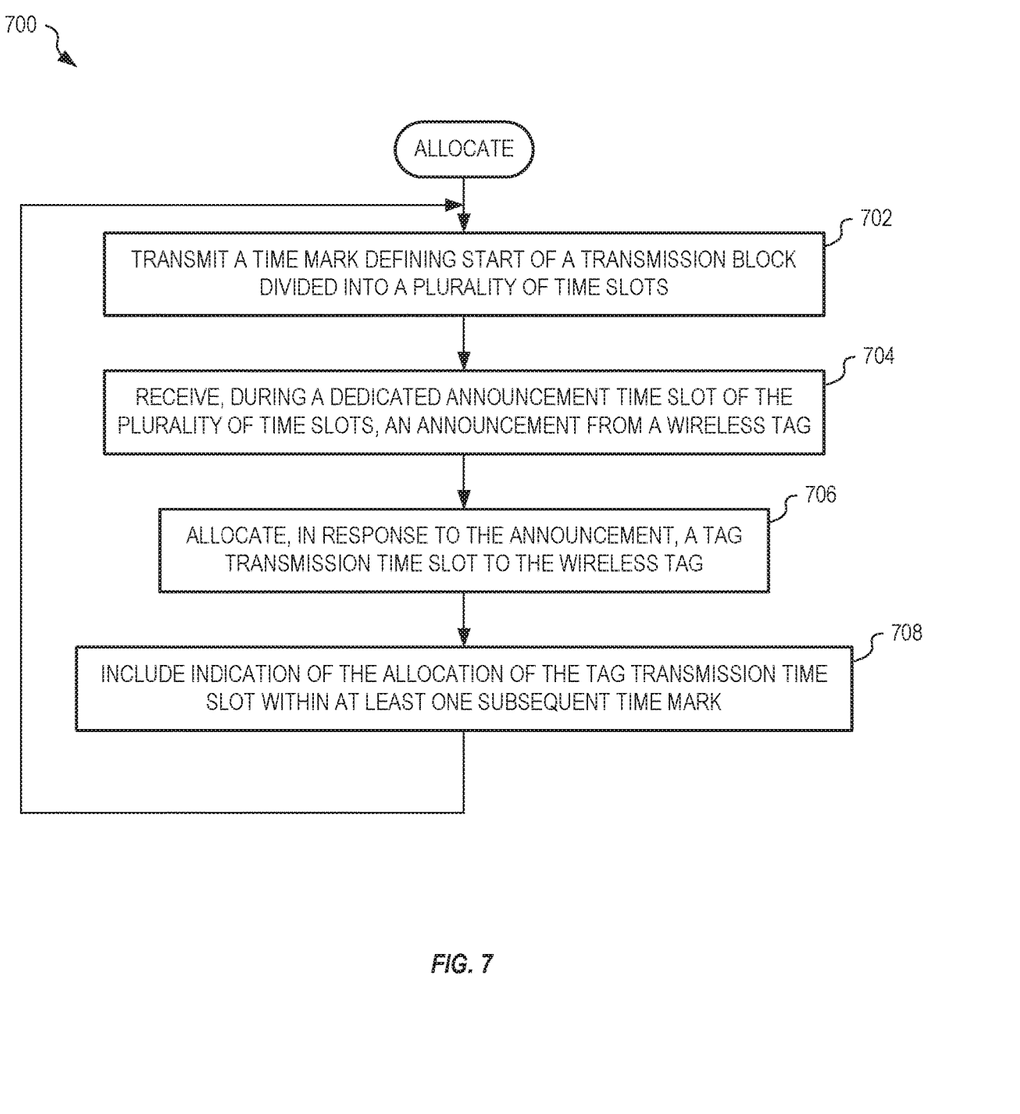
FIG. 7 is a flowchart illustrating one example method for dynamically scheduling wireless transmissions without collision, in an embodiment.

FIG. 7 is a flowchart illustrating one example method 700 for dynamically scheduling wireless transmissions without collision. Method 700 is for example implemented within master transmitter 106 and computer 110. In step 702, method 700 transmits a time mark defining start of a transmission block that is divided into a plurality of time slots. In one example of step 702, master transmitter 106 transmits master time mark 302 at the start of transmission block 300, which is divided into a plurality of time slots 200. In step 704, method 700 receives, during a dedicated announcement time slot of the plurality of time slots, an announcement from a wireless tag. In one example of step 704, allocator 112 receives, via receiver 104, announcement 308 when transmitted by wireless tag 102 within time slot 127. In step 706, method 700 allocates, in response to the announcement, a tag transmission time slot to the wireless tag. In one example of step 706, allocator 112 allocates time slot 27 to wireless tag 102. In step 708, method 700 includes indication of the allocation of the tag transmission time slot within at least one subsequent time mark. In one example of step 708, master transmitter 106 includes time slot allocation 601 within a subsequent master time mark 302.

Steps 702 through 708 repeat to periodically transmit master time mark 302 to receive announcements 308, and to allocate time slots 200 to wireless tags 102.

Figure 8:
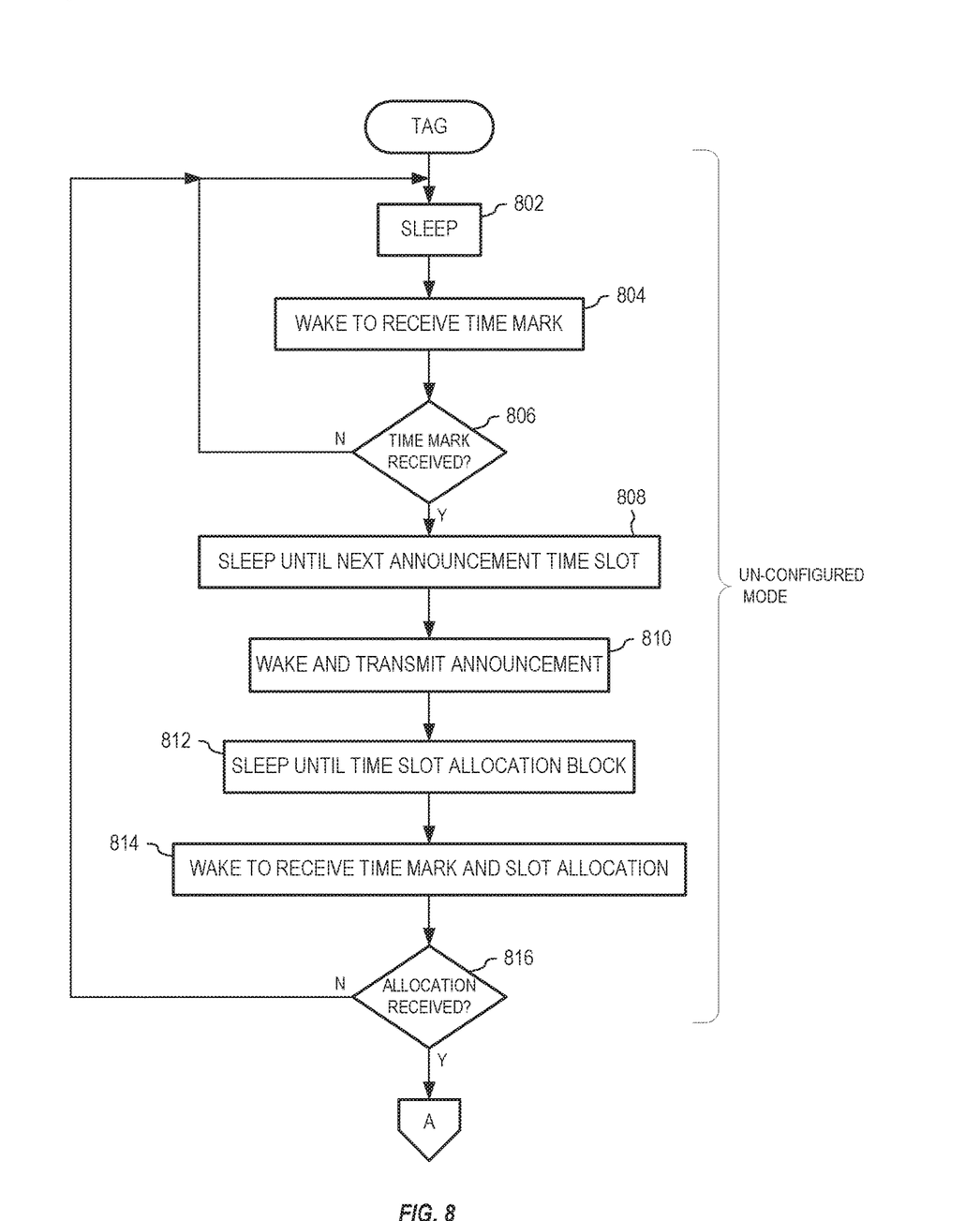
FIGS. 8 and 9 are a flowchart illustrating one example method with dynamically scheduled wireless tag transmissions, in an embodiment.
Figure 9:
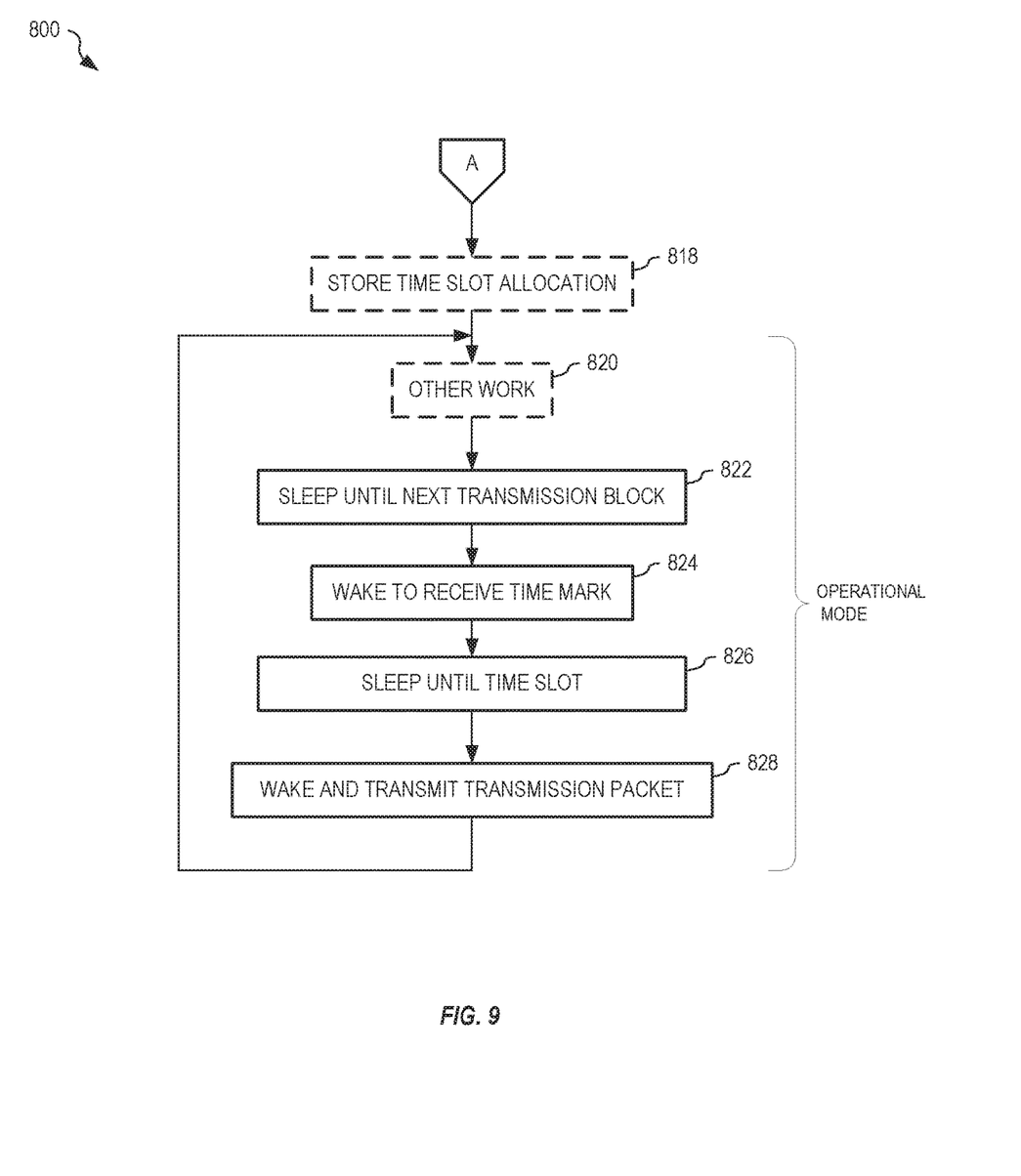

FIGS. 8 and 9 are a flowchart illustrating one example method 800 with dynamically scheduled wireless tag transmissions. Method 800 is for example implemented within each wireless tag 102. Method 800 may be also implemented within other devices that transmit information to computer 110, such as receiver 104, and transmitter 106, 108.

In step 802, method 800 sleeps. In one example of step 802, tag 102 sleeps for one minute. In step 804, method 800 wakes to receive a time mark. In one example of step 804, tag 102 wakes and activates its receiver for 20 ms to receive time mark 302 and/or 304. Step 806 is a decision. If, in step 806, method 800 determines that a time mark was successfully received in step 804, method 800 continues with step 808; otherwise method 800 continues with step 802. Steps 802 through 806 repeat until tag 102 receives a time mark 302 and/or 304.

In step 808, method 800 sleeps until a next announcement time slot. In one example of step 808, tag 102 configures a timer, implemented within tag 102, to mature at the start of announcement time slot 127 of the current block 300 and then configures itself into a low power mode to wait for the timer to mature. In step 810, method 800 wakes and transmits an announcement. In one example of step 810, the timer matures and wakes tag 102, which then transmits announcement 308. In step 812, method 800 sleeps until the time slot allocation block. In one example of step 812, tag 102 configures a timer to wake tag 102 at the start of the sixteenth subsequent transmission block 300, and then configures itself in a low power mode.

In step 814, method 800 wakes to receive the time mark and its slot allocation. In one example of step 814, the timer matures and wakes tag 102, which then activates its receiver to receive master time mark 302, which is expected to contain its time slot allocation information.

Step 816 is a decision. If, in step 816, method 800 determines that the time slot information was included within the received time mark, method 800 continues with step 818 of FIG. 9; otherwise, method 800 continues with step 802. Steps 802 through 816 thus repeat until tag 102 receives its time slot allocation information.

Step 818 is optional. If included, in step 818, method 800 stores the received time slot information. In one example of step 818, tag 102 stores time slot allocation 601 indicating a time slot 200 value of twenty-seven, an interval of one, and a phase of zero, within a memory of tag 102. Step 820 is optional. If included, in step 820, method 800 performs other work. In one example of step 820, tag 102 may include other sensors that are activated and read during step 820 to monitor biometrics parameters of an athlete configured with tag 102. In step 822, method 800 sleeps until a next transmission block. In one example of step 822, based upon received time slot information, tag 102 configures a time to wake tag 102 at the start of the next transmission block 300, and then configures itself into a low power mode.

In step 824, method 800 wakes to receive a time mark. In one example of step 824, the timer matures and wakes tag 102, which activates its receiver to receive master time mark 302 and synchronizes its internal clock with the received master time mark 302. In step 826, method 800 sleeps until its assigned time slot. In one example of step 826, tag 102 configures a timer to mature at the start of time slot twenty-seven of the current block. In step 828, method 800 wakes and transmits its transmission packet. In one example of step 828, the timer awakens tag 102, which activates its transmitter and transmits transmission packet 202.

Steps 820 through 828 repeat until new time slot allocation 601 is received or until time marks are not received for sixteen consecutive cycles, whereupon method 800 returns to step 802.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

A. A system dynamically schedules wireless transmissions without collision within a repeating frame. Each frame is divided into a plurality of consecutive blocks and each block is divided into a plurality of consecutive time slots, a first predefined time slot in each block is used for announcement transmissions. The system includes a master transmitter capable of transmitting a master time mark during a second predefined time slot in each block. The master time mark includes a time slot reservation area for indicating dynamic allocation of time slots. The system also includes a processor communicatively coupled with the master transmitter, a non-transitory memory communicatively coupled with the processor, a time slot reservation table stored within the memory for tracking the predefined time slots and dynamic allocation of the time slots within each block, and an allocator, implemented as machine readable instructions stored in the memory and executed by the processor, capable of: allocating, based upon the time slot reservation table, at least one unallocated time slot in at least one of the plurality of blocks for use by a transmitting device in response to an announcement message received from the transmitting device during the first predefined time slot; and updating the time slot reservation area and the time slot reservation table to indicate the allocation of the at least one time slot to the transmitting device. The transmitting device receives a subsequent master time mark and transmits only during the indicated at least one time slot of a subsequent frame.

B. In the system denoted as A, the allocator being further capable of calculating an interval value and a phase value for the at least one time slot. The interval value and the phase value indicating in which of the plurality of blocks of each frame the at least one time slot occurs.

C. In either of the systems denoted as A or B, the interval value being a positive integer defining a block interval period, and the phase value being an integer having a range of zero to the interval value minus one and defines within which of the interval value block the at least one time slot occurs.

D. In any of the systems denoted as A-C, each frame having a duration tf, each block has a duration tb, and each time slot has a duration tt, the allocator further capable of calculating the interval value and the phase value based upon tf, tb, and tt and a desired transmission period (ping rate) of the transmitting device.

E. In any of the systems denoted as A-D, further including at least one slave transmitter communicatively coupled with the processor and capable of transmitting a slave time mark during a third predefined time slot of each block, the slave time mark including a copy of the time slot reservation area. The at least one slave transmitter is located to extend the transmission range of the master transmitter.

F. In any of the systems denoted as A-E, further including at least one receiver in communication with the processor and located to receive transmissions from the master transmitter and the one transmitting device.

G. In any of the systems denoted as A-F, the transmitting device being attached to an object to be tracked at a sporting event.

H. In any of the systems denoted as A-G, the transmitting device determining the timing of the at least one time slot based upon a time of receiving each master time mark and a time slot counter stored within the master time mark.

I. In any of the systems denoted as A-H, the master transmitter further capable of automatically incrementing a time slot counter stored within the master time mark.

J. A method dynamically schedules wireless transmissions without collision. A master transmitter periodically transmits a time mark during a first predefined time slot of a plurality of consecutive time slots that form a transmission block. A plurality of consecutive transmission blocks form a frame. An announcement transmission from a wireless transmitting device is received via at least one receiver during a second predefined time slot of the plurality of time slots. An allocator allocates, at least partly based upon the received announcement transmission, a third time slot of the plurality of time slots to the wireless transmitting device. A time slot reservation area of at least one subsequently transmitted time mark includes indication of the allocation of the third time slot to the wireless transmitting device. The wireless transmitting device receives the subsequently transmitted time mark and transmits only during the third time slot of subsequent frames.

K. In the method denoted as J, calculating, when allocating, an interval value and a phase value for the third time slot based upon a desired ping rate of the wireless transmitting device. The interval value and the phase value indicate in which of a plurality of subsequent transmission blocks of each frame the third time slot occurs.

L. In either of the methods denoted as J or K, the interval value is a positive integer defining a block interval period and the phase value is an integer having a range of zero to the interval value minus one and defining within which of the interval value blocks of each frame the third time slot occurs.
M. In any of the methods denoted as J-L, each frame has a duration df, each block has a duration tb, and each time slot has a duration tt. The interval value and the phase value are calculated based upon tf, tb, and tt and the desired ping rate of the wireless transmitting device.
N. In any of the methods denoted as J-M, further including storing indication of the allocated time slots within a time slot reservation table. The step of allocating utilizing the time slot reservation table to allocate an un-allocated time slot to the wireless transmitter.
O. In any of the methods denoted as J-N, the first predefined time slot and the second predefined time slot are invariant within each transmission block.
P. In any of the methods denoted as J-O, the third time slot is not concurrently allocated to other wireless transmitting devices.
Q. In any of the methods denoted as J-P, further including transmitting from at least one slave transmitter a slave time mark during a fourth predetermined time slot of each block. The slave time mark is based upon the time mark, and the slave transmitter is positioned to extend the operational range of the master transmitter.
R. In any of the methods denoted as J-Q, further including automatically incrementing, within the master transmitter, a time slot counter and including the time slot counter within the master time mark, such that the time slot counter indicates a sequential number of the most recent time slot.
S. In any of the methods denoted as J-R, the wireless transmitting device determines timing of the third time slot based upon receiving each master time mark.
T. In any of the methods denoted as J-S, the wireless transmitting device is attached to an object to be tracked at a sporting event.

What is claimed is:
1. A wireless scheduling method comprising:
transmitting a master time mark during a first time slot of a plurality of consecutive time slots forming a transmission block of a frame;
receiving, during a second time slot of the plurality of consecutive time slots, an announcement transmitted by a wireless transmitting device;
allocating, in response to said receiving, a third time slot of the plurality of consecutive time slots to the wireless transmitting device;
updating a time-slot reservation table with a new time-slot allocation indicating that the third time slot is allocated to the wireless transmitting device, the time-slot reservation table storing a plurality of time-slot allocations for a corresponding plurality of wireless transmitting devices; and
transmitting a subsequent master time mark that includes a time-slot reservation area having a plurality of time-slot allocations from the time-slot reservation table, one of the plurality of time-slot allocations being the new time-slot reservation.
2. The method of claim 1, wherein:
said allocating further comprises calculating an interval value and a phase value for the third time slot based on a desired ping rate of the wireless transmitting device; and
the interval value and the phase value indicate in which of a plurality of subsequent transmission blocks of each frame the third time slot occurs.
3. The method of claim 2, wherein:
the interval value is a positive integer defining a block interval period; and
the phase value is an integer having a range of zero to the interval value minus one.
4. The method of claim 2, wherein:
each frame has a duration df;
each transmission block has a duration tb;
each of the plurality of consecutive time slots has a duration tt; and
said calculating comprises calculating the interval value and the phase value based on tf, tb, tt, and the desired ping rate.
5. The method of claim 1, wherein:
the first time slot and the second time slot are invariant within each transmission block; and
the third time slot is not concurrently allocated to any of the plurality of wireless transmitting devices.
6. The method of claim 1,
further comprising transmitting a slave time mark during a fourth time slot of the plurality of consecutive time slots;
wherein the slave time mark is based on the master time mark.
7. The method of claim 1, further comprising:
incrementing a time-slot counter that indicates a sequential number of a most-recent time slot of the plurality of consecutive time slots; and
including the sequential number with the master time mark.
8. A system for dynamically scheduling wireless transmissions without collision within a repeating frame, wherein each frame is divided into a plurality of consecutive blocks and each block is divided into a plurality of consecutive time slots, said system comprising:
a processor;
a memory communicatively coupled with the processor;
a time-slot reservation table stored within the memory and including a plurality of time-slot allocations for a corresponding plurality of wireless transmitting devices;
a master transmitter configured to transmit, during a first time slot of the plurality of consecutive time slots, a master time mark that includes a time-slot reservation area having a plurality of time-slot allocations from the time-slot reservation table; and
an allocator implemented as machine-readable instructions that are stored in the memory and, when executed by the processor, control the system to:
allocate, in response to receiving an announcement transmitted by a new wireless device during a second time slot of the plurality of consecutive time slots, a third time slot of the plurality of consecutive time slots to the new wireless transmitting device,
update the time-slot reservation table with a new time-slot allocation indicating that the third time slot is allocated to the new wireless transmitting device, and
transmit, via the master transmitter, a subsequent master time mark whose time-slot reservation area includes the new time-slot reservation;
wherein the new wireless transmitting device, in response to receiving the subsequent master time mark, configures itself to transmit only during the third time slot.

9. The system of claim 8, wherein:
the allocator includes additional machine-readable instructions that, when executed by the processor, control the system to calculate an interval value and a phase value for the third time slot based on a desired ping rate of the new wireless transmitting device;
the interval value and the phase value indicating in which of the plurality of consecutive blocks of each frame the third time slot occurs.

10. The system of claim 9, wherein:
the interval value is a positive integer defining a block interval period; and
the phase value is an integer having a range of zero to the interval value minus one.

11. The system of claim 9, wherein:
each frame has a duration tf;
each of the plurality of consecutive blocks has a duration tb;
each of the plurality of consecutive time slots has a duration tt; and
the allocator includes additional machine-readable instructions that, when executed by the processor, control the system to calculate the interval value and the phase value based on tf, tb, and tt, and the desired ping rates.

12. The system of claim 8, further comprising at least one slave transmitter communicatively coupled with the processor and configured to transmit a slave time mark during a fourth time slot of the plurality of consecutive time slots, the slave time mark including a copy of the time-slot reservation area, wherein the at least one slave transmitter is located to extend the transmission range of the master transmitter.

13. The system of claim 8, further comprising at least one receiver communicatively coupled with the processor and located to receive transmissions from the plurality of wireless transmitting devices.

14. The system of claim 8, wherein each of the plurality of wireless transmitting devices is configured to be attached to an object to be tracked at a sporting event.

15. The system of claim 8, wherein the allocator includes additional machine-readable instructions that, when executed by the processor, control the system to:
store in the memory a time-slot counter that indicates a sequential number of a most-recent time slot of the plurality of consecutive time slots, and
transmit the sequential number with the master time mark.

16. The system of claim 15, wherein the allocator includes additional machine-readable instructions that, when executed by the processor, control the system to increment the time-slot counter.

17. A wireless scheduling method, comprising:
receiving, by a tracking tag, a master time mark during a first time slot of a plurality of consecutive time slots forming a transmission block of a frame;
transmitting, by the tracking tag and during a second time slot of the plurality of consecutive time slots, an announcement identifying the tracking tag; and
receiving, by the tracking tag, a subsequent master time mark that includes a time-slot reservation area having a plurality of time-slot allocations, one of the plurality of time-slot allocations indicating that a third time slot of the plurality of consecutive time slots is allocated to the tracking tag;
wherein the tracking tag configures itself to transmit only during the third time slot of each subsequent transmission block.

18. The wireless scheduling method of claim 17, further comprising calculating, by the tracking tag and for each subsequent transmission block, a start time of the third time slot relative to a time when the master time mark is received.

19. The wireless scheduling method of claim 17, further comprising entering, by the tracking tag, a low-power mode when the tracking tag is not receiving the master time mark and when the tracking tag is not transmitting during the third time slot.

20. The wireless scheduling method of claim 17, further comprising entering, by the tracking tag, a low-power mode for a predefined duration to wait for the time-slot reservation area to contain a time-slot allocation for the tracking tag, the predefined duration corresponding to a plurality of blocks and being sized such that an allocator within a tracking apparatus can assign the third time slot to the tracking tag.

* * * * *